US011397512B2

(12) United States Patent
Peng et al.

(10) Patent No.: US 11,397,512 B2
(45) Date of Patent: Jul. 26, 2022

(54) ELECTRONIC DEVICE AND PREDICTION METHOD FOR SELECTING TARGET OBJECT IN GRAPHICAL USER INTERFACE

(71) Applicant: Delta Electronics, Inc., Taoyuan (TW)

(72) Inventors: Jia-Hong Peng, Taoyuan (TW); Yu-Qiao Hong, Taoyuan (TW); Hung-Hsueh Tai, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 294 days.

(21) Appl. No.: 16/532,976

(22) Filed: Aug. 6, 2019

(65) Prior Publication Data
US 2020/0285352 A1  Sep. 10, 2020

(30) Foreign Application Priority Data
Mar. 5, 2019 (CN) .......................... 201910164465.3

(51) Int. Cl.
*G06F 3/0482* (2013.01)
*G06F 3/04812* (2022.01)
(Continued)

(52) U.S. Cl.
CPC .......... *G06F 3/0482* (2013.01); *G06F 3/0484* (2013.01); *G06F 3/04812* (2013.01); *G06F 3/0488* (2013.01)

(58) Field of Classification Search
USPC ........................................................ 715/812
See application file for complete search history.

(56) References Cited

U.S. PATENT DOCUMENTS 5,327,528 A * 7/1994 Hidaka ............... G06F 3/04842
345/642
8,860,679 B2 * 10/2014 Azuma ................. G06F 3/0416
345/173
(Continued)

FOREIGN PATENT DOCUMENTS

CN         103403665 A       11/2013
CN         104620203 A        5/2015
(Continued)

OTHER PUBLICATIONS

Office Action dated May 14, 2020 in TW Application No. 108107178.

*Primary Examiner* — Sherief Badawi
*Assistant Examiner* — Conrad R Pack
(74) *Attorney, Agent, or Firm* — Muncy, Geissler, Olds & Lowe, P.C.

(57) ABSTRACT

A prediction method for selecting a target object for use in an electronic device is provided. The method includes the steps of: (A) displaying a plurality of objects and a cursor on a display of the electronic device; (B) obtaining moving speed, a moving vector, and a cursor position of the cursor as well as a plurality of object positions of the objects; (C) in response to the cursor position and the object positions satisfying a predetermined condition, determining whether a previously selected object exists; (D) in response to the previously selected object existing and the moving speed of the cursor being greater than a speed threshold, selecting the object with the shortest distance to the cursor as the target object by referencing the previously selected object and referring to the motion vector.

10 Claims, 9 Drawing Sheets

(51) Int. Cl.
*G06F 3/0484* (2022.01)
*G06F 3/0488* (2022.01)

(56) References Cited

U.S. PATENT DOCUMENTS

| | | | |
|---|---|---|---|
| 2006/0232551 | A1 | 10/2006 | Matta |
| 2006/0288314 | A1* | 12/2006 | Robertson ........... G06F 3/04812 715/863 |
| 2009/0055779 | A1* | 2/2009 | Watanabe ............. G06F 3/0481 715/862 |
| 2009/0262086 | A1* | 10/2009 | Chen ..................... G06F 3/0488 345/173 |
| 2010/0115550 | A1* | 5/2010 | Minnick .......... H04N 21/42224 725/37 |
| 2013/0335337 | A1* | 12/2013 | Chua ..................... G06F 3/0488 345/173 |
| 2015/0058800 | A1* | 2/2015 | Sweeney ............... G06F 3/0482 715/800 |
| 2015/0066735 | A1* | 3/2015 | Buck ................... G06F 3/04842 705/37 |

FOREIGN PATENT DOCUMENTS

| | | |
|---|---|---|
| CN | 105378608 A | 3/2016 |
| TW | 200928905 A | 7/2009 |
| TW | 201405413 A | 2/2014 |
| TW | 201421298 A | 6/2014 |

\* cited by examiner

ELECTRONIC DEVICE AND PREDICTION METHOD FOR SELECTING TARGET OBJECT IN GRAPHICAL USER INTERFACE

CROSS REFERENCE TO RELATED APPLICATIONS

This Applications claims priority of China Patent Application No. 201910164465.3 filed on Mar. 5, 2019 the entirety of which is incorporated by reference herein.

BACKGROUND OF THE INVENTION

Field of the Invention

The invention relates to an electronic device, and, in particular, to an electronic device and a prediction method for selecting a target object in a graphical user interface.

Description of the Related Art

Due to the popularity of computer systems, it is quite common to utilize a computer system's input devices (such as a mouse, trackball, keyboard, etc.) in various applications to control the cursor on the screen rendered on the display. However, in a conventional computer system, the user often needs to move the cursor a long distance across the screen to select the desired target object, or move the cursor onto the desired target object to select it. The above-mentioned operation of selecting the target object is not efficient, resulting in a poor user experience.

Accordingly, there is demand for an electronic device and a prediction method for selecting a target object to solve the aforementioned problem.

BRIEF SUMMARY OF THE INVENTION

A detailed description is given in the following embodiments with reference to the accompanying drawings.

In an exemplary embodiment, a prediction method for selecting a target object for use in an electronic device is provided. The method includes the steps of: (A) displaying a plurality of objects and a cursor on a display of the electronic device; (B) obtaining moving speed, a motion vector, and a cursor position of the cursor, as well as a plurality of object positions of the plurality of objects; (C) in response to the cursor position and the object positions satisfying a predetermined condition, determining whether a previously selected object exists; and (D) in response to the previously selected object existing and the moving speed being greater than a speed threshold, selecting one of the objects having a shortest distance to the cursor as a target object by referencing the previously selected object and referring to the motion vector.

In another exemplary embodiment, an electronic device is provided. The electronic device includes: a display, a storage device, and a processor. The storage device is configured to store an application. The processor is configured to execute the application to perform the steps of: (A) displaying a plurality of objects and a cursor on a display of the electronic device; (B) obtaining moving speed, a motion vector, and a cursor position of the cursor, as well as a plurality of object positions of the plurality of objects; (C) in response to the cursor position and the object positions satisfying a predetermined condition, determining whether a previously selected object exists; and (D) in response to the previously selected object existing and the moving speed being greater than a speed threshold, selecting one of the objects having a shortest distance to the cursor as a target object by referencing the previously selected object and referring to the motion vector.

In yet another exemplary embodiment, a prediction method for selecting a target object for use in an electronic device is provided. The method includes the steps of: (A) displaying a plurality of objects and a cursor on a display of the electronic device; (B) obtaining moving speed, a motion vector, and a cursor position of the cursor, as well as a plurality of object positions of the plurality of objects; (C) in response to the cursor position and the object positions satisfying a predetermined condition, determining whether a previously selected object exists; and (D) calculating a weighted motion vector of the cursor in response to the previously selected object not existing, and selecting one of the object having a shortest distance in a specific direction to the cursor after movement as the target object in response to the cursor being moved according to the calculated weighted motion vector.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
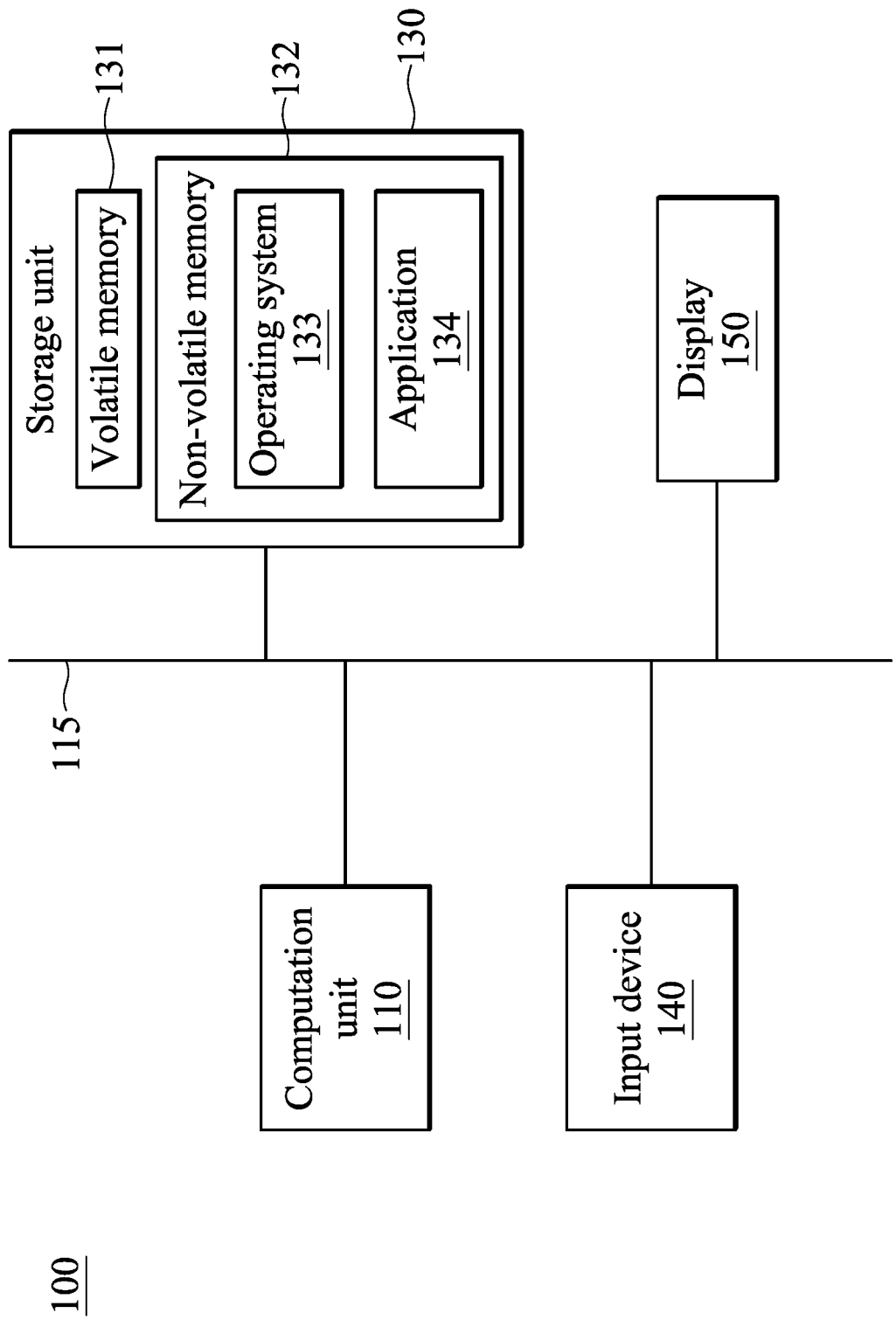
FIG. 1 is a block diagram of an electronic device in accordance with an embodiment of the invention.

FIG. 1 is a block diagram of an electronic device in accordance with an embodiment of the invention.

The electronic device 100, for example, may be a personal computer, a server, or a portable electronic device. The electronic device 100 may include a computation unit 110, a storage unit 130, an input device 140, and a display 150. The computation unit 110, storage unit 130, input device 140, and display 150 may communicate with each other via a bus 115.

The computation unit 110 can be implemented in numerous ways, such as with dedicated hardware, or with general-purpose hardware (e.g., a single processor, multiple processors capable of parallel computations, graphics processing units, or other processor having computation capability) that provide functions as described later when performing program code or software associated with the flow of the present invention.

The storage unit 130 may include a volatile memory 131 and a non-volatile memory 132. The non-volatile memory 132 may be configured to store an operating system 133 and an application 134. The non-volatile memory 132, for example, may be a hard disk drive, a solid-state disk, a flash memory, or a read-only memory, but the invention is not limited thereto. The volatile memory 131, for example, may be a random access memory such as a static random access memory (SRAM) or a dynamic random access memory (DRAM), but the invention is not limited thereto.

In an embodiment, the computation unit 110 may load the operating system 133 and application 134 from the non-volatile memory 132 to the volatile memory 131 for execution, wherein the application 134 may display a graphical user interface (GUI) on the display 150, and the GUI may include a plurality of objects and a cursor.

The input device 140 is configured to perform a corresponding operation on the GUI, and the input device, for example, may be a mouse, a trackball, or a keyboard, etc., but the invention is not limited thereto.

The display 150 may be a display panel (e.g., a thin-film liquid-crystal display panel, an organic light-emitting diode (OLED) panel, or other panels having display capability) configured to display input characters, numbers, symbols, moving trajectories of drag cursors, or the user interface provided by the application for viewing by the user. In some embodiments, the display 150 can be integrated with a touch device to form a touch screen, and the user can use the finger or the stylus to perform a touch action on the touch panel, thereby operating on the GUI.

Figure 2A:
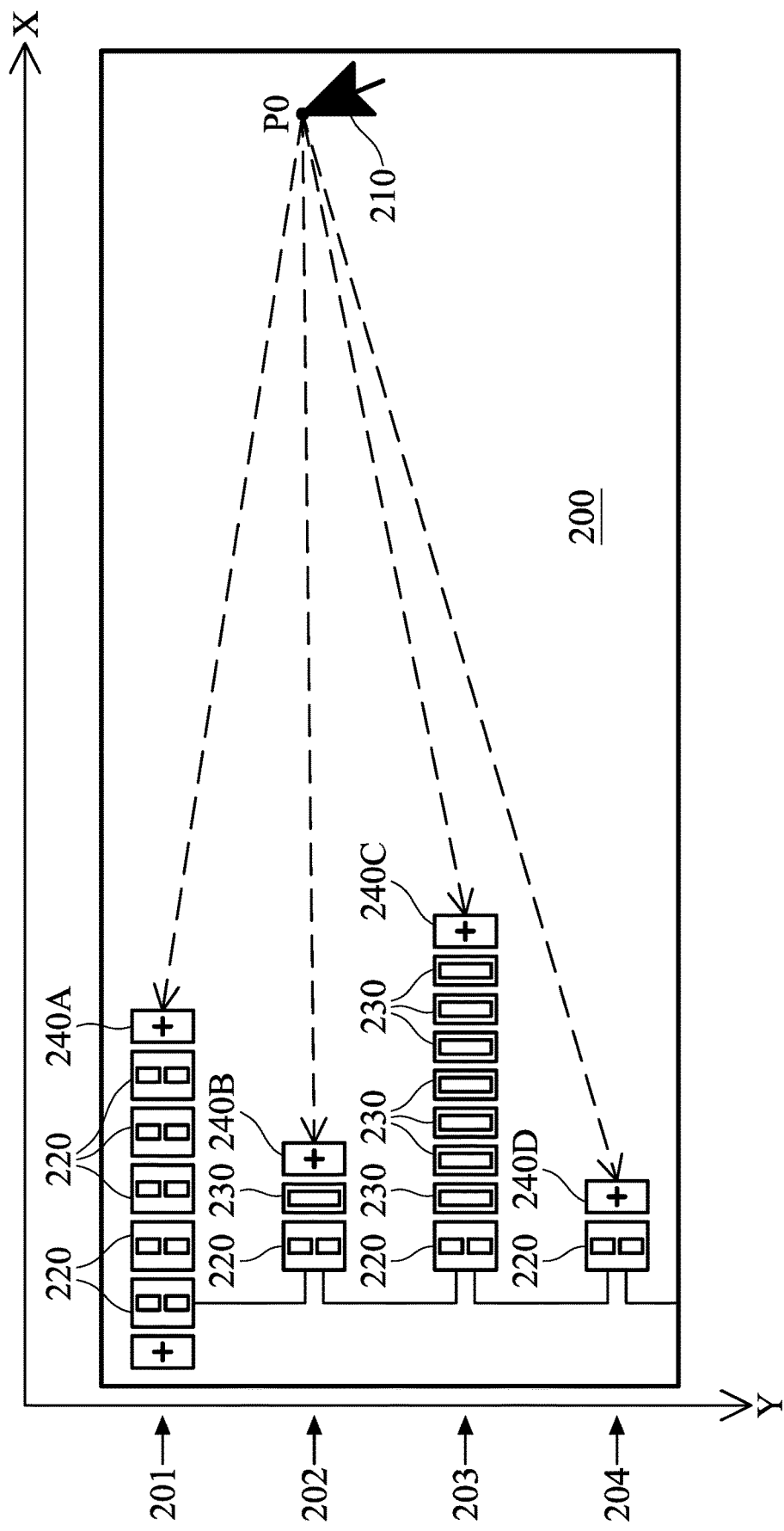
FIG. 2A is a diagram of selecting a target object according to the shortest distance in accordance with an embodiment of the invention.

FIG. 2A is a diagram of selecting a target object according to the shortest distance in accordance with an embodiment of the invention.

Referring to FIG. 1 and FIG. 2A, in an embodiment, the application 134 executed by the computation unit 110, for example, may be a modular-computer system management application that may display the graphical user interface 200 on the display 150, wherein the GUI 200 may include a cursor 210 and a plurality of objects 220, 230, and 240A~240D. Each object 220 may correspond to a first-type module, and each object 230 may correspond to a second-type module. The first-type module has two slots which can be regarded as two target objects with a smaller size, and the second-type module has one slow which can be regarded as a target object with a larger size. The objects 240A~240D, for example, may correspond to the option of "expansion modules". That is, the user may attach a selected module (e.g., a first-type module, second-type module, or a module of other types) on the right side of each of the module rows 201~204.

For example, as depicted in FIG. 2A, the objects 220, 230, and 240A~240D in the GUI 200 can be categories into four module rows 201~204, wherein the module row 201 may include five objects 220 and the object 240A; the row 202 may include one object 220, one object 230, and the object 240B; the module row 203 may include one object 220, seven objects 230, and the object 240C; and the module row 203 may include one object 220 and the object 240D.

In an embodiment, the coordinates on the screen displayed on the display 150, are positive to the right of the X-axis and positive to the bottom of the Y-axis. The computation unit 110, for example, may repeatedly obtain the coordinates of the cursor 210 on the screen displayed on the display 150, where the coordinates of the cursor 210's position P0 is with reference to the vertex of the cursor 210, such as (x0, y0). If the user selects an expansion module (e.g., object 220 or 230) on the GUI 200, and the expansion module can be added to one of the objects 240A~240D, thereby attaching an expansion module (e.g., object 220 or 230) on the right side of the corresponding one of the module rows 201~204.

The computation unit 110 may calculate the Euclidean distance between the cursor position P0 of the cursor 210 to each position of the objects 240A~240D, and select the object having the shortest distance as the target object. In the embodiment, the distance between the cursor position P0 of the cursor 210 and the position of the object 240C is the shortest distance, and thus the object 240C is selected as the target object which can be emphasized by different image effects such as emphasized by colors, highlighted, flashed, reversed, and the like, but the invention is not limited thereto.

If the user selects a computer module on the GUI 200, for example, corresponding to one of the slots of the object 220, the empty slot in each object 220 in the GUI 200 will be regarded as a different object, and the computation unit 110 may calculate the distance between the cursor position P0 of the cursor 210 and each object, and select the object with the shortest distance as the target object.

It should be noted that FIG. 2A is used to explain how to calculate the object having the shortest distance from the cursor 210, and the calculation method can be applied to one of the prediction methods of the selected target object in the present invention. The details thereof will be described later.

Figure 2B:
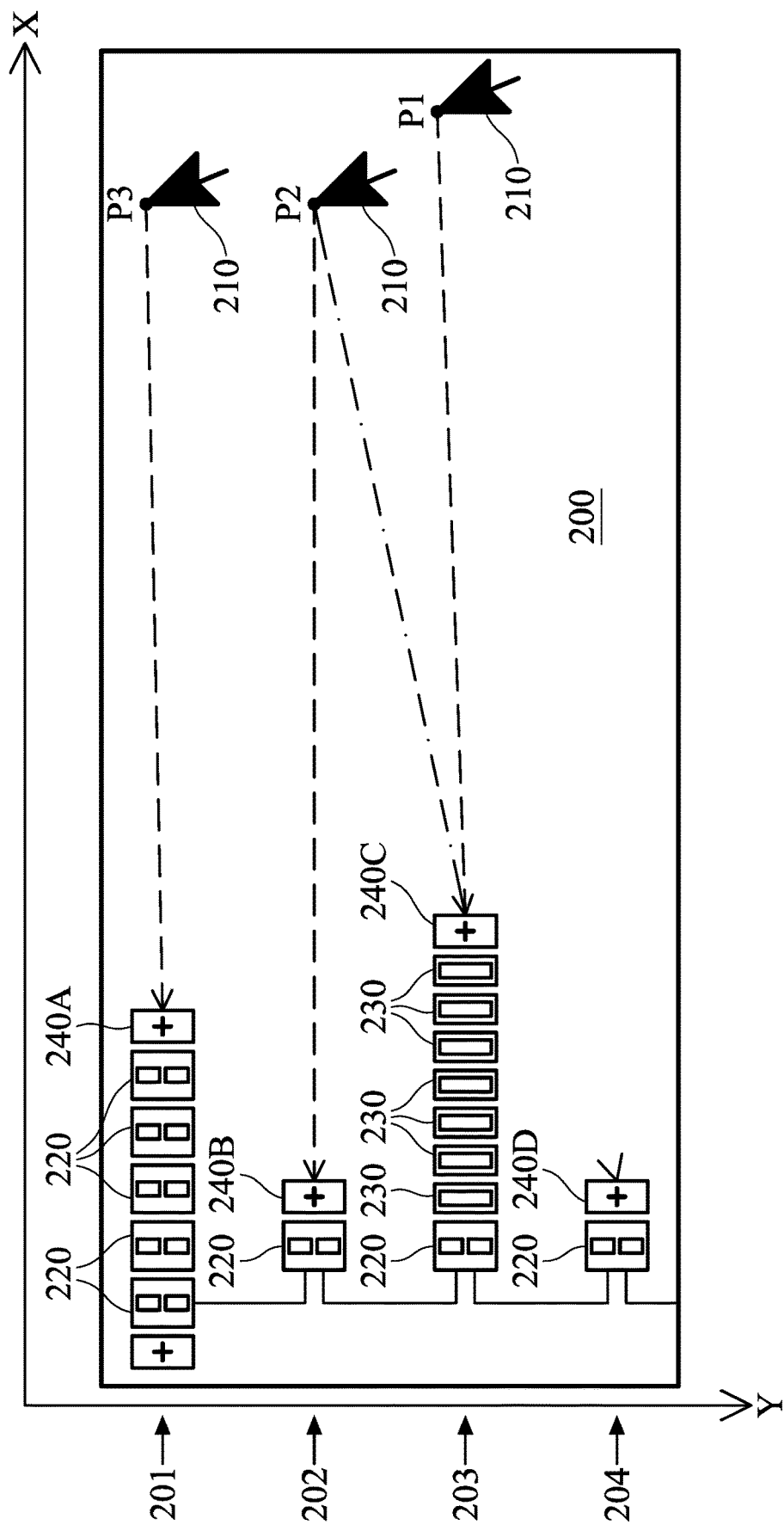
FIG. 2B is a diagram of selecting the target object according to the coordinate-axis weighting in accordance with an embodiment of the invention.

FIG. 2B is a diagram of selecting the target object according to the coordinate-axis weighting in accordance with an embodiment of the invention.

In an embodiment, if the user also selects an expansion module (e.g., object 220 or 230) on the GUI 200, and the selected expansion module, for example, may be added to one of the objects 240A~240D, thereby adding the expansion module (e.g., object 220 or 230) on the right side of the corresponding one of the module rows 201~204. However, the position of the expansion module to be added by the user is located in that of the object 240B, and the cursor 210 moves at the cursor positions P1 to P3 on the right side of the GUI 200. If the calculation method of the shortest distance in FIG. 2A is used, the computation will calculate that the object having the shortest distance to the cursor 210 refers to the object 240C, and the object 240B cannot be selected. Thus, in this scenario, the computation unit 110 may use the coordinate-axis weighting calculation method.

For example, when the user utilizes the input device 140 to move the cursor 210, the computation unit 110 may repeatedly calculate the cursor position, cursor speed, and motion vector of the cursor 210 shown on the screen displayed on the display 150. Then, the computation unit 110 may calculate a weighted motion vector of the cursor 210, and select an object having the shortest distance to the moved cursor 210 in a specific direction as the target object in response to the movement of the cursor 210 according to the weighted motion vector.

Specifically, as depicted in FIG. 2B, according to the arrangement of the module rows 201~201 in the GUI 200, the computation unit 110 may set a first weighting value of the motion vector of the cursor 210 along the horizontal direction to 0, and set a second weighting value of the motion vector of the cursor 210 along the vertical direction to 1. In addition, the computation unit 110 may also determine that the horizontal direction as the specific direction according to the arrangement of the module rows 201~204. It should be noted that the movement of the cursor 210 in the horizontal direction does not affect the selection of the target object at this time due to the arrangement of the module rows 201~204, and thus the computation unit 110 may not consider the movement of the cursor 210 in the horizontal direction.

For example, when the cursor 210 is located at the cursor position P1 such as coordinates (x1, y1) after movement, the vertical distance between the cursor 210 and the object 240C is 0, and the object 240C is also the object having the shortest distance to the cursor 210 in the specific direction (e.g., the horizontal direction). Accordingly, the computation unit 110 may select the object 240C as the target object.

Similarly, when the cursor 210 is located at the cursor position P2 such as coordinates (x2, y2) after movement, the vertical distance between the cursor 210 and the object 240B is 0, and the object 240B is the object having the shortest distance to the cursor 210 in the specific direction (i.e., the horizontal direction). That is, the computation unit 110 may select the object 240B as the target object. When the cursor 210 is located at the cursor position P2, although the object 240C has the shortest distance to the cursor 210, the computation unit 110 may still select the object 240B as the target object according to the calculation method of coordinate-axis weighting.

It should be noted that FIG. 2B is used to explain how to use the method of coordinate-axis weighting to calculate the object having the shortest distance to the cursor 210 in the specific direction, and the method of coordinate-axis weighting can be applied to one of the prediction methods of the selected target object in the present invention. The details thereof will be described later.

Figure 2C:
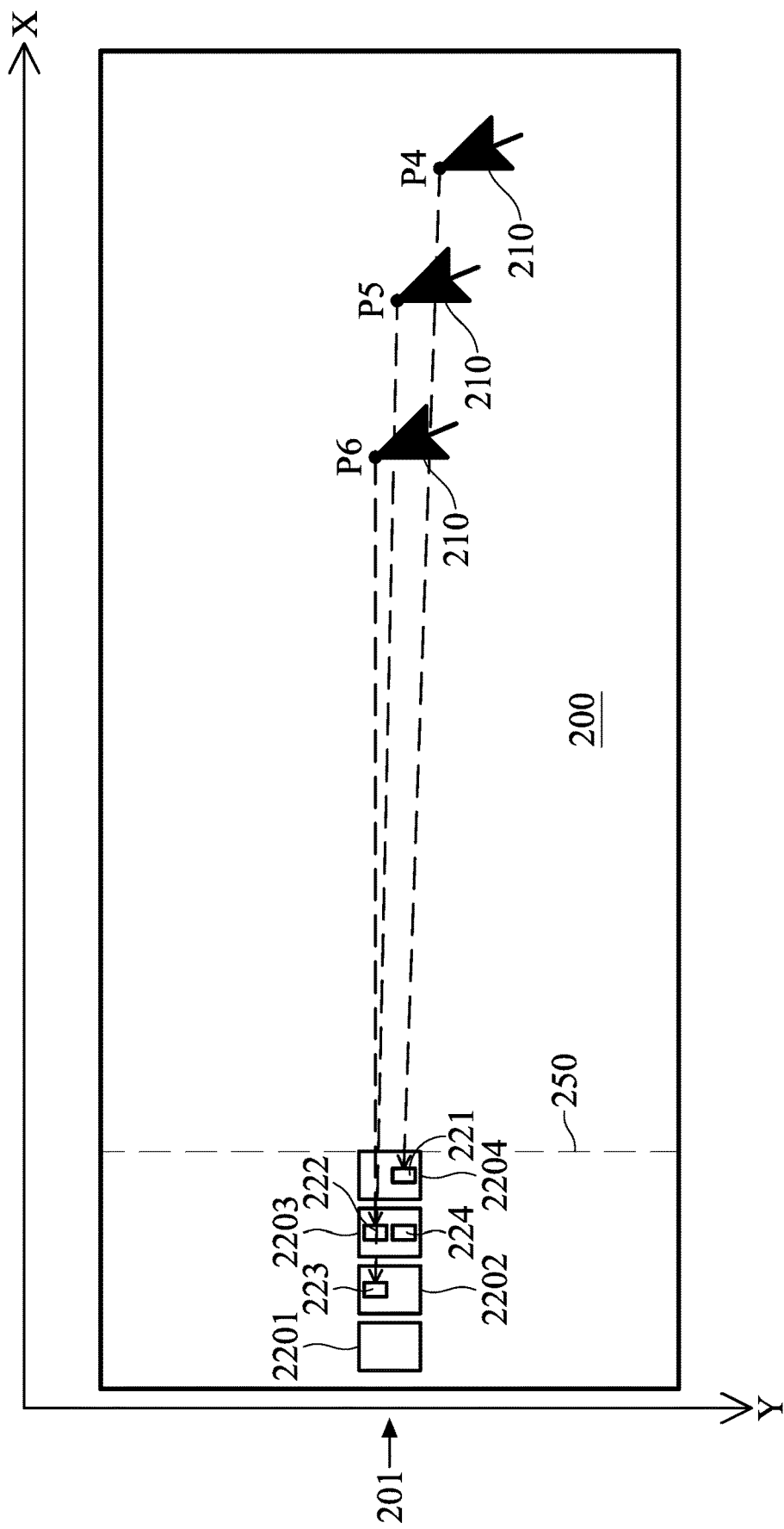
FIG. 2C is a diagram of selecting the target object according to the reference position and the motion vector in accordance with an embodiment of the invention.

FIG. 2C is a diagram of selecting the target object according to the reference position and the motion vector in accordance with an embodiment of the invention.

In an embodiment, the objects 2201~2204 are similar to the objects 220 in FIG. 2A, and the distance D between the cursor 210 and each slot in the objects 2201~2204 is greater than a predetermined distance Dt. Each of the objects 2201~2204 may have two slots. Among the objects 2201~2204, the object 2202 may include an empty slot 223, and the object 2203 may include an empty slot 222, and the object 2204 may include an empty slot 221. In addition, the right side of the dashed line 250 labeled on the GUI 200 may indicate that the distance D between the cursor 210 and each of the objects 2201~2204 (i.e., each can be regarded as an object) is greater than a predetermined distance Dt. The left side of the dashed line 250 may indicate that the distance D between the cursor 210 and each of the objects 2201~2204 (i.e., each can be regarded as an object) is less than or equal to the predetermined distance Dt.

The slot 221 may be originally one of the empty slots in the object 2204. The user has previously selected the slot 221 corresponding to a computer module on the GUI 200, and inserted the object of the computer module into the slot 221. That is, the slot 221 can be regarded as a previously selected object. In response to a moving speed V of the cursor 210 is greater than a speed threshold Vt, the computation unit 110 may select the object having the shortest distance to the cursor 210 as the target object by using the previously selected object (i.e., slot 221) as the reference and referring to the motion vector of the cursor 210.

For example, when the cursor 210 moves from the cursor position P4 to the cursor position P5 and the moving speed V of the cursor 210 is greater than the speed threshold Vt, the computation unit 110, for example, may select the slot 222 in the object 2203 as the target object by using the previously selected object (i.e., slot 221) as the reference and referring to the motion vector $\overline{P4P5}$.

Then, the cursor 210 moves from the cursor position P5 to the cursor position P6 and the moving speed V of the cursor 210 is greater than the speed threshold Vt, the computation unit 110 may select the slot 223 in the object 2202 as the target object by using the previously selected object (i.e., slot 221) as the reference and referring to the motion vectors $\overline{P4P5} + \overline{P5P6}$.

Figure 2D:
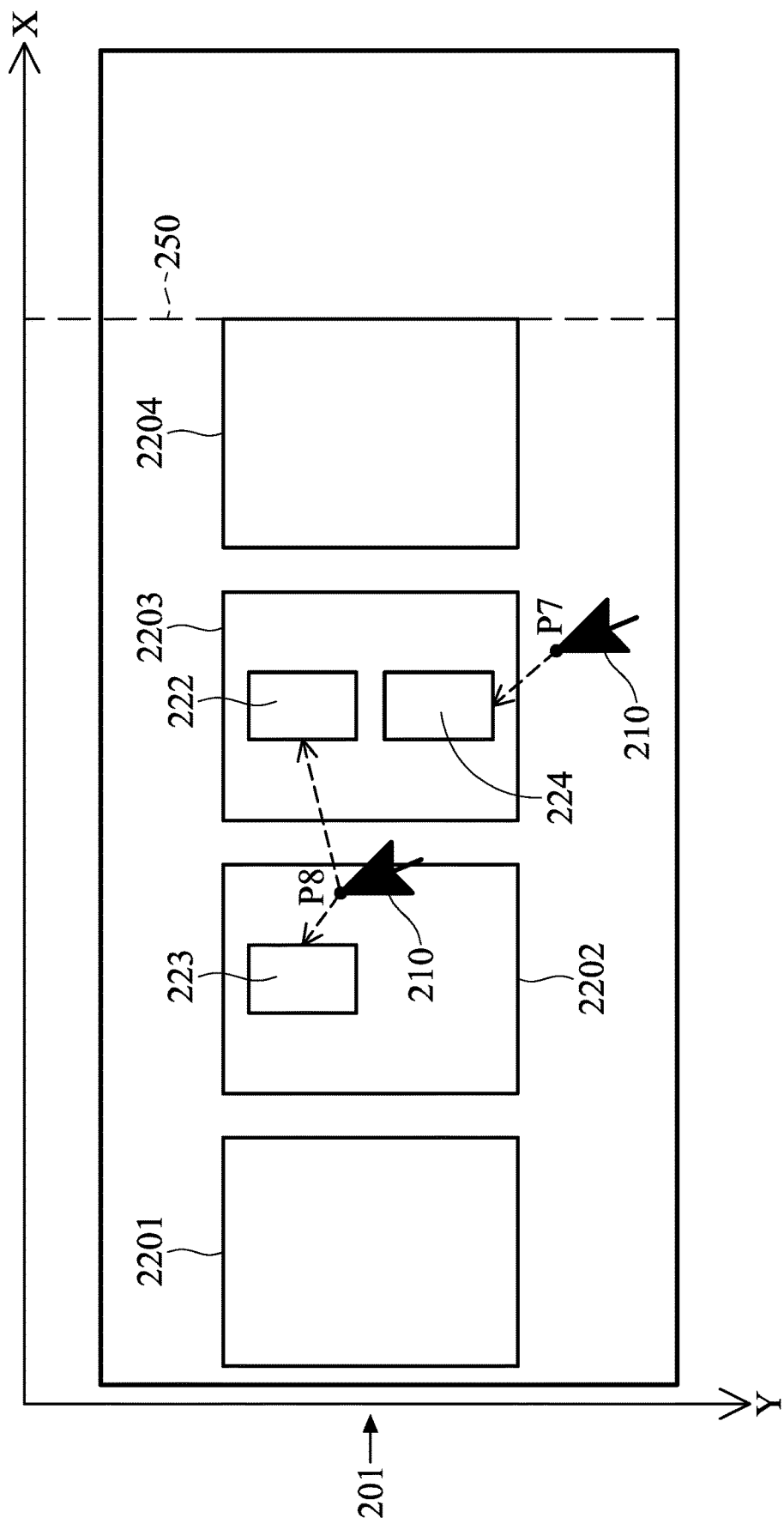
FIG. 2D is a diagram of selecting the target object according to the shortest distance in accordance with the embodiment of FIG. 2C.

FIG. 2D is a diagram of selecting the target object according to the shortest distance in accordance with the embodiment of FIG. 2C.

As depicted in FIG. 2D, when the cursor 210 moves to the left side of the dashed line 250, the computation unit 110 may select the object having the shortest distance to the cursor 210 as the target object. For example, similar to the manner described in FIG. 2A, when the cursor 210 moves to the cursor position P7, the object 224 has the shortest distance to the cursor 210. Accordingly, the computation unit 110 may select the object 224 as the target object. When the cursor 210 moves to the cursor position P8, although the objects 222 and 223 are very close to the cursor 210, the computation unit 110 can calculate the object 223 having the shortest distance to the cursor 210. Accordingly, the computation unit 110 may select the object 223 as the target object.

It should be noted that in the embodiments in FIGS. 2A~2D, the modular computer system management program is used as an example, and the present invention is not limited thereto. For example, the arrangement of the objects in the GUI may be different from the arrangement of the horizontal rows in FIGS. 2A~2D, and the computation unit 110 may determine a specific direction and the weighting values in the horizontal direction and vertical direction of the motion vector of the cursor according to the arrangement of the objects in the GUI.

In an embodiment, when the objects in the GUI are arranged in columns from left to right, the computation unit 110 may set the weighting value of the motion vector in the vertical direction to 0, and the set the weighting value of the motion vector in the horizontal direction to 1. That is, the computation unit 110 may not consider the motion of the cursor in the vertical direction.

Figure 3A:
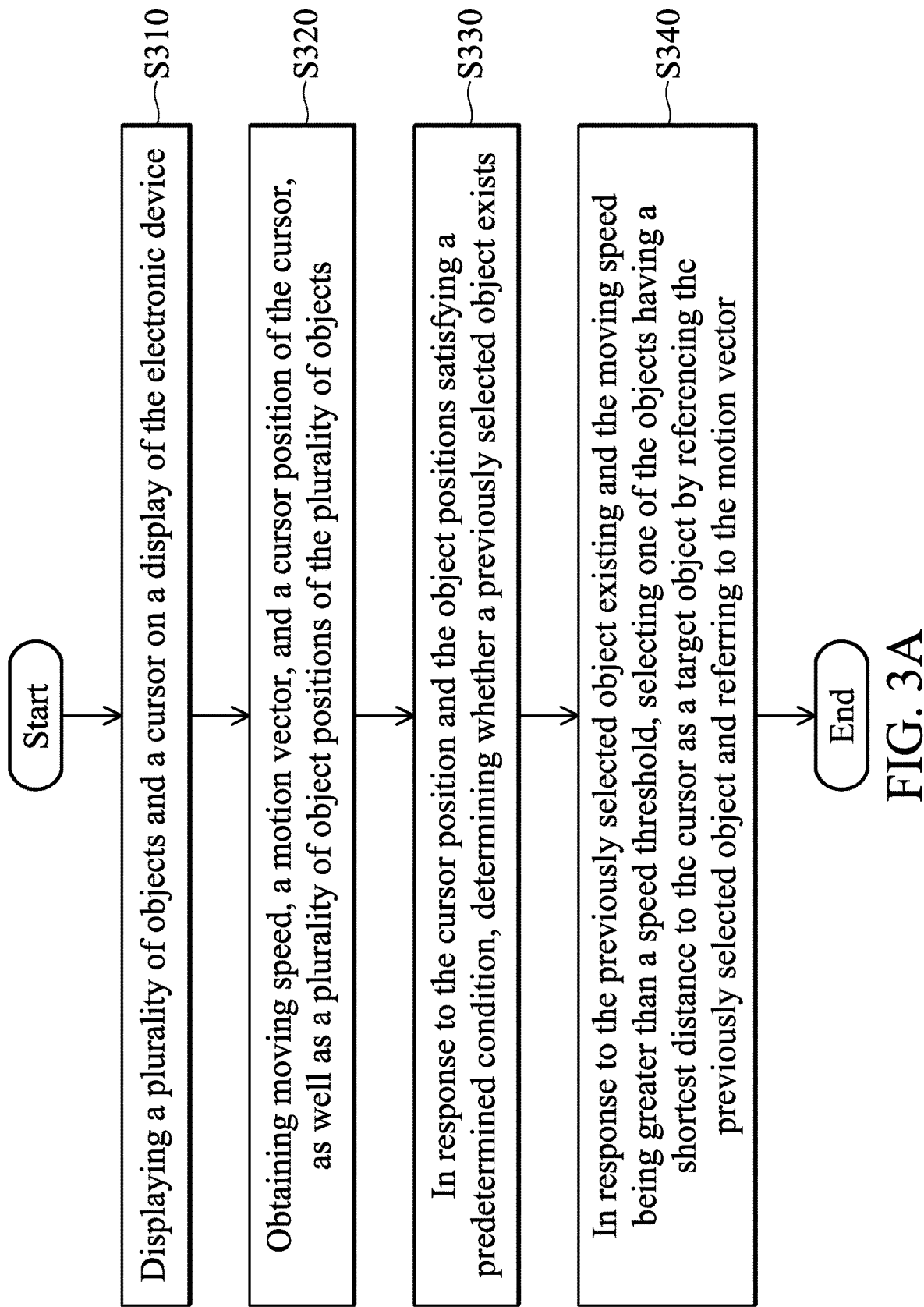
FIG. 3A is a flow chart of a prediction method of selecting a target object in accordance with an embodiment of the invention.

FIG. 3A is a flow chart of a prediction method of selecting a target object in accordance with an embodiment of the invention.

Referring to FIG. 1, FIGS. 2A~2D, and FIG. 3A, in step S310, a plurality of object and a cursor are displayed on the display 150 of the electronic device 100.

In step S320, a moving speed, a motion vector, and a cursor position of the cursor as well as a plurality of object positions of the objects are obtained. For example, each of the objects 220 and 230 shown in FIG. 2A may have a corresponding slot, and each slot can be regarded as an object, and the object position of each object can be expressed as coordinates (x, y) in the image displayed on the display 150.

In step S330, when the cursor position and the object positions satisfy a predetermined condition, it is determined whether a previously selected object exists. For example, the predetermined condition may indicate that the distance between the cursor position and each object position is greater than a predetermined distance. For example, the right side of the dashed line 250 in FIG. 2C may indicate that the distance between the cursor position and each object position is greater than the predetermined distance.

In step S340, in response to the previously selected object existing and the moving speed of the cursor being greater than a speed threshold, the object having the shortest distance to the cursor is selected as a target object with reference to the previously selected object and the motion vector. For example, referring to the embodiment of FIG. 2C, the slot 221 may be the previously selected object. When the cursor 210 moves from the cursor position P4 to the cursor position P5 and the moving speed V of the cursor 210 is greater than the speed threshold Vt, the computation unit 110, for example, may select the slot 222 in the object 2203 as the target object by using the previously selected object (i.e., slot 221) as the reference and referring to the motion vector $\overline{P4P5}$. Then, the cursor 210 moves from the cursor position P5 to the cursor position P6 and the moving speed V of the cursor 210 is greater than the speed threshold Vt, the computation unit 110 may select the slot 223 in the object 2202 as the target object by using the previously selected object (i.e., slot 221) as the reference and referring to the motion vectors $\overline{P4P5} + \overline{P5P6}$.

Figure 3B:
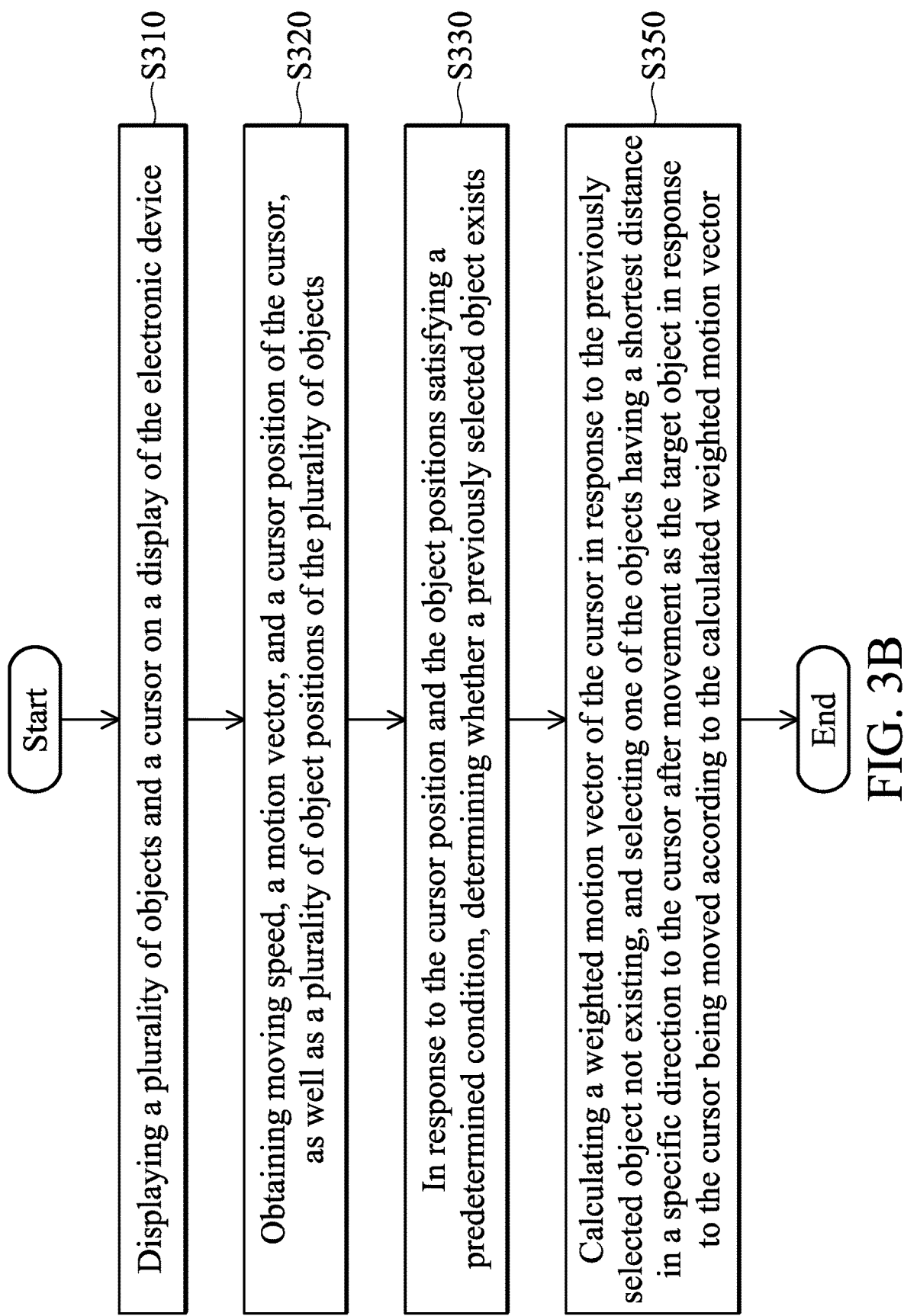
FIG. 3B is a flow chart of a prediction method of selecting a target object in accordance with another embodiment of the invention.

FIG. 3B is a flow chart of a prediction method of selecting a target object in accordance with another embodiment of the invention.

Steps S310~S330 in the flow of FIG. 3B are similar to those in FIG. 3A. The differences between the flows in FIG. 3A and FIG. 3B may be step S350 is performed after step S330 in FIG. 3B.

Referring to FIG. 2B and FIG. 3B, in step S350, in response to the previously selected object not existing, a weighted motion vector of the cursor is calculated, and the object having the shortest distance in a specific direction to the cursor after movement is selected as the target object in response to the motion of the cursor based on the calculated weighted motion vector.

For example, when the previously selected object does not exist, the computation unit 110 cannot use the previously selected object as the reference to predict the target object. Meanwhile, the computation unit 110 may determine the target object according to the method of coordinate-axis weighting. For example, the computation unit 110 may determine the first weighting value in the horizontal direction and the second weighting value in the vertical direction, and determine the specific direction corresponding to the arrangement of the objects in the GUI. In the embodiment of FIG. 2B, the specific direction may be the horizontal direction. When the cursor 210 is at the cursor position P2 after movement, the vertical between the cursor 210 and the object 240B is 0, and the object 240B is the object having the shortest distance to the cursor 210 in the specific direction (i.e., the horizontal direction). That is, the computation unit 110 may select the object 240B as the target object. When the cursor 210 is at the cursor position P2, although the object 240C has the shortest distance to the cursor 210, the computation unit 110 may still select the object 240B as the target object using the calculation method of coordinate-axis weighting.

Figure 4A:
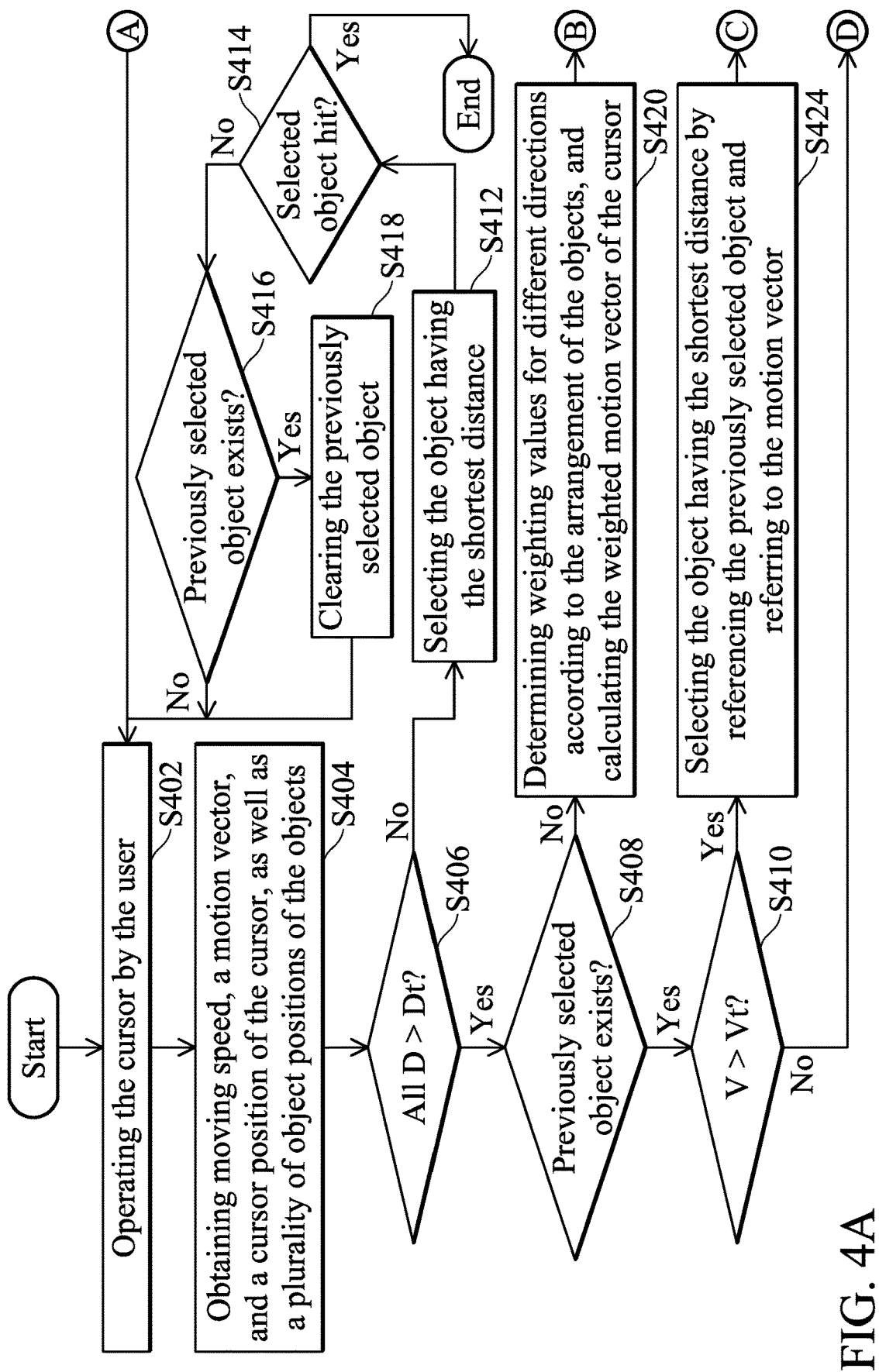
FIGS. 4A~4B are portions of a detailed flow chart of a prediction method of selecting a target object in accordance with an embodiment of the invention.
Figure 4B:
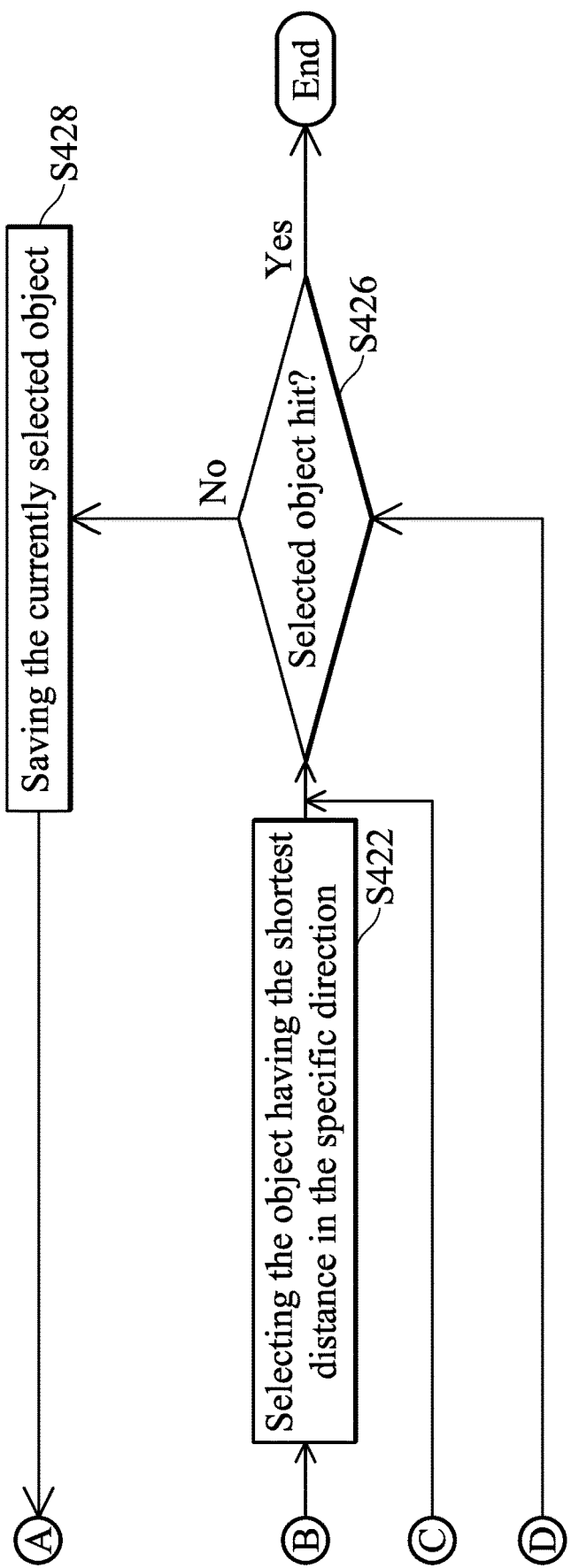

FIGS. 4A~4B are portions of a detailed flow chart of a prediction method of selecting a target object in accordance with an embodiment of the invention.

Referring to FIG. 1, FIG. 2, and FIG. 4, in step S420, a cursor is operated by the user. For example, the user may control the movement of the cursor on the GUI via the input device 140, or control the movement of the cursor on the GUI via touch actions performed on the display 150 (e.g., a touch screen).

In step S404, moving speed, a motion vector, and a cursor position of the cursor, as well as a plurality of object positions of the objects are obtained. For example, when the user is operating the cursor, the computation unit 110 may obtain or calculate the moving speed, motion vector, and cursor position of the cursor. In addition, the GUI may include the plurality of object, and the computation unit 110 may obtain the object position corresponding to each object.

In step S406, it is determined whether the distance D between the cursor and each object is greater than a predetermined distance Dt. If the distance D between the cursor and each object is greater than the predetermined distance Dt, step S408 is performed. If the distance D between the cursor and each object is not greater than the predetermined distance Dt, step S412 is performed. For example, the right side of the dashed line 250 in FIG. 2C may indicate that the distance between the cursor position and each object position is greater than the predetermined distance, and the left side of the dashed line 250 in FIG. 2C may indicate that the distance between the cursor position and each object position is not greater than the predetermined distance.

In step S408, it is determined whether a previously selected object exists. If the previously selected object exists, step S410 is performed. If the previously selected object does not exist, step S420 is performed. For example, if the previously selected object exists, the computation unit 110 may use the previously selected object as the reference, and refer to the motion vector of the cursor to quickly calculate the target object to be selected. If the previously selected object does not exist, the computation unit 110 may calculate the target object to be selected using the method of coordinate-axis weighting according to the arrangement of objects in the GUI.

In step S410, it is determined whether the moving speed V of the cursor is greater than a speed threshold Vt. If the moving speed V of the cursor is greater than the speed threshold Vt, step S424 is performed. If the moving speed V of the cursor is less than or equal to the speed threshold Vt, step S426 is performed. For example, if the moving speed V of the cursor is greater than the speed threshold Vt, it indicates that the user wants to quickly select the desired target object, and thus the previously selected object can be used as a reference, and the motion vector of the cursor can be referred to quickly calculate the target object to be selected.

In step S412, the object having the shortest distance is selected. For example, the left side of the dashed line 250 in FIG. 2C may indicate that the distance between the cursor position and each object position is not greater than the predetermined distance. Since the cursor position of the cursor is very close to each object, and thus the computation unit 110 may still have to calculate the object having the shortest distance to the cursor as the target object.

In step S414, it is determined whether the selected object is hit. If the selected object is hit, the flow ends. If the selected is not hit, step S416 is performed. For example, although the computation unit 110 has selected the object having the shortest distance to the cursor, the user may not have moved the cursor to the vicinity of the object to be selected. Therefore, it is still necessary to continue to control the cursor movement via the input device 140.

In step S416, it is determined whether a previously selected object exists. If the previously selected object exists, step S418 is performed. If the previously selected object does not exist, the flow goes back to step S402. For example, if the previously selected object exists but the user does not select the desired target object, step S418 is performed at this time to clear the previously selected object.

In step S420, weighting values for different directions are determined according to the arrangement of the objects, and the weighted motion vector of the cursor is calculated. For example, the arrangement of each object in the GUI can be different from the arrangement of horizontal rows in FIGS. 2A~2D, and the computation unit 110 may determine the weighting values of the motion vector of the cursor in the horizontal direction and the vertical direction, and a specific direction according to the arrangement of each object in the GUI. In another embodiment, when each object in the GUI is arranged in columns from left to right, the computation unit 110 may set the weighting value of the motion vector of the cursor in the vertical direction to 0, and set the weighting value of the motion vector of the cursor in the horizontal direction to 1. That is, the computation unit 110 may not consider the movement of the cursor in the vertical direction.

In step S422, the object having the shortest distance to the cursor in the specific direction is selected. For example, in the embodiment of FIG. 2B, the specific direction is the horizontal direction. When the cursor 210 is located at the cursor position P2 after movement, the vertical distance between the cursor 210 and the object 240B is 0, and the object 240B is the object having the shortest distance to the cursor in the specific direction (i.e., the horizontal direction). That is, the computation unit 110 may select the object 240B as the target object. When the cursor 210 is located at the cursor position P2, although the object 240C has the shortest distance to the cursor 210, the computation unit 110 may still select the object 240B as the target object according to the calculation method of coordinate-axis weighting.

In step S424, the object having the shortest distance to the cursor is selected by referencing the previously selected object and referring to the motion vector. In step S426, it is determined whether the selected object is hit. If the selected object is hit, the flow ends. If the selected object is not hit, step S428 is performed.

For example, although the computation unit 110 may determine the object to be selected in different steps (e.g., step S422 or S424), the selected object may not be the desired object to be selected by the user. At this time, step S428 is performed to save the currently selected object. For example, in the embodiment of FIG. 2C, when the cursor 210 is moved from the cursor position P4 to the cursor position P5, the target object selected by the computation unit 110 at this time is the slot 222, but it is not the desired object to be selected by the user. Accordingly, the computation unit 110 may save the selected slot 222, and the flow goes back to step S402, and the user may continue to operate the cursor movement to select the desired target object.

Specifically, the prediction method of selecting the target object in the present invention allows the user to select the desired target object without moving the cursor on the screen for a long distance, and can switch between different prediction modes (e.g., the shortest distance, coordinate-axis weighting, and referencing the previously selected object, etc.) according to the distance between the cursor and the object and the moving speed and motion vector of the cursor, so as to quickly predict the target object desired by the user.

It should be noted that the embodiments in FIGS. 2~4 are described using the GUI, but the prediction method of selecting the target object in the present invention is not limited to the two-dimensional GUI. For example, the prediction method of selecting the target object in the present invention can also be applied to augmented reality (AR), virtual reality (VR), human-computer interaction, and wearable technology, and the cursor can be regarded as the hand of the user or a specific object. The user, for example, may control the cursor to move in a three-dimensional space, and the object position of each object in the three-dimensional space can be expressed by three-dimensional coordinates (x, y, z). In addition, the predetermined distance set in the two-dimensional GUI may represent a predetermined distance range in the three-dimensional space, such as a plane or a spherical surface.

When the computation unit 110 calculates the motion vector of the cursor, it indicates that the computation unit 110 calculates the motion vector of the cursor in the three-dimensional space, and respectively determines the first weighting value, second weighting value, and third weighting value of the weighted motion vector along the X-axis, Y-axis, and Z-axis according to the arrangement of the objects in the three-dimensional space, and determines the specific direction corresponding to the arrangement of the objects. In addition, the computation unit 110 may calculate the weighted motion vector in a similar manner as described in the embodiments of the two-dimensional GUI, and determine the object having the shortest three-dimensional distance to the cursor in the specific direction as the target object.

In view of the above, an electronic device and a prediction method of selecting a target object are provided in the present invention. The electronic device and the prediction method may obtain different factors from operations of the cursor by the user, such as the distance between the cursor and each object, and the moving speed and motion vector of the cursor, in order to switch between different prediction modes (e.g., shortest distance, coordinate-axis weighting, referencing the previously selected object, etc.), so as to quickly predict the target object desired by the user, thereby allowing the user to quickly perform operation on the desired target object to enhance the user experience.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of program code transmitted over some transmission medium, such as an electrical wire or a cable, or through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A prediction method for selecting a target object, for use in an electronic device, wherein the electronic device comprises a processor, the method comprising:
    (A) displaying, by the processor, a plurality of objects and a cursor on a graphical user interface displayed on a display of the electronic device;
    (B) obtaining, by the processor, moving speed, a motion vector, and a cursor position of the cursor, as well as a plurality of object positions of the plurality of objects;
    (C) in response to the cursor position and the object positions satisfying a predetermined condition, determining, by the processor, whether a previously selected object exists; and
    (D) in response to the previously selected object existing and the moving speed being greater than a speed threshold, utilizing the processor to obtain a first position by adding the motion vector to a reference position of the previously selected object, and to select a first object, which has a shortest distance to the first position, from the objects as a target object, wherein the first object is emphasized by the processor on the graphical user interface displayed on the display.

2. The method as claimed in claim 1, wherein, in step (C), the predetermined condition indicates that a distance between the cursor position and each of the object positions is greater than a predetermined distance.

3. The method as claimed in claim 2, wherein after step (C), the method further comprises:
    in response to the previously selected object not existing, calculating, by the processor, a weighted motion vector of the cursor; and
    in response to the cursor being moved according to the calculated weighted motion vector, selecting, by the processor, a second object, which has another shortest distance in a specific direction from the moved cursor, from the objects as the target object.

4. The method as claimed in claim 3, wherein the step of calculating the weighted motion vector of the cursor comprises:
    respectively determining, according to arrangement of the objects, a first weighting value of the weighted motion vector in a horizontal direction, a second weighting value of the weighted motion vector in a vertical direction, and the specific direction; and
    calculating the weighted motion vector of the cursor according to the first weighting value and the second weighting value.

5. The method as claimed in claim 1, wherein after step (C), the method further comprises:
    in response to the previously selected object existing and the moving speed of the cursor not being greater than the speed threshold, setting, by the processor, the previously selected object as the target object.

6. An electronic device, comprising:
    a display;
    a storage device, configured to store an application; and
    a processor, configured to execute the application to perform the steps of:
    (A) displaying a plurality of objects and a cursor on a graphical user interface displayed on the display of the electronic device;
    (B) obtaining moving speed, a motion vector, and a cursor position of the cursor, as well as a plurality of object positions of the plurality of objects;
    (C) in response to the cursor position and the object positions satisfying a predetermined condition, determining whether a previously selected object exists; and
    (D) in response to the previously selected object existing and the moving speed being greater than a speed threshold, obtaining a first position by adding the motion vector to a reference position of the previously selected object, and to select a first object, which has a shortest distance to the first position, from the objects as a target object, wherein the first object is emphasized by the processor on the graphical user interface displayed on the display.

7. The electronic device as claimed in claim 6, wherein, in step (C), the predetermined condition indicates that a distance between the cursor position and each of the object positions is greater than a predetermined distance.

8. The electronic device as claimed in claim 6, wherein, after step (C), the processor calculates a weighted motion vector of the cursor in response to the previously selected object not existing, and selects a second object, which has another shortest distance in a specific direction from the moved cursor, from the objects as the target object in response to the cursor being moved according to the calculated weighted motion vector.

9. The electronic device as claimed in claim 8, wherein while calculating the weighted motion vector of the cursor, the processor respectively determines, according to arrangement of the objects, a first weighting value of the weighted motion vector in a horizontal direction, a second weighting value of the weighted motion vector in a vertical direction, and the specific direction, and calculates the weighted motion vector of the cursor according to the first weighting value and the second weighting value.

10. The electronic device as claimed in claim 6, wherein, after step (C), in response to the previously selected object existing and the moving speed of the cursor not being greater than the speed threshold, the processor sets the previously selected object as the target object.

* * * * *